United States Patent [19]

Gravel

[11] Patent Number: 4,591,944
[45] Date of Patent: May 27, 1986

[54] ELECTRONIC CIRCUIT FOR TACTILE SENSORS

[75] Inventor: David P. Gravel, Allen Park, Mich.

[73] Assignee: GMF Robotics Corporation, Troy, Mich.

[21] Appl. No.: 649,007

[22] Filed: Sep. 10, 1984

[51] Int. Cl.$^4$ .................................. H01H 47/00
[52] U.S. Cl. ........................... 361/170; 901/33; 901/42; 340/665; 307/124; 219/86.41
[58] Field of Search ............... 361/170, 188; 318/626; 340/665; 901/33, 42, 46, 49; 73/862.04; 307/119, 124

[56] References Cited

U.S. PATENT DOCUMENTS

| | | | |
|---|---|---|---|
| 3,805,169 | 4/1974 | Hayakawa et al. | 901/46 X |
| 3,845,657 | 11/1974 | Hall et al. | 340/665 X |
| 3,919,563 | 11/1975 | Lautier et al. | 340/665 X |
| 3,948,093 | 4/1976 | Folchi et al. | 73/862.04 |
| 4,283,764 | 8/1981 | Crum et al. | 901/46 X |
| 4,305,028 | 12/1981 | Kostas et al. | 901/49 X |
| 4,369,663 | 1/1983 | Venturello et al. | 73/862.04 |

Primary Examiner—L. T. Hix
Assistant Examiner—David M. Gray
Attorney, Agent, or Firm—Brooks & Kushman

[57] ABSTRACT

An electronic circuit adapted to receive conditioned force signals from a three-axes load cell mounted on the arm of a robot and provide a stop signal for use by a controller of the robot. The circuit compares the sum of the absolute value of the forces with a variable reference signal. A force trip relay and a masking relay are connected in parallel to provide the stop signal when both the resulting sum is greater in value than the reference signal and the robot is in an operating condition in which high forces do not normally occur.

8 Claims, 3 Drawing Figures

ELECTRONIC CIRCUIT FOR TACTILE SENSORS

TECHNICAL FIELD

This invention relates to an electronic circuit for sensing overload conditions and, in particular, to an electronic circuit for a tactile sensor mounted on the arm of a robot.

BACKGROUND ART

In robotic welding applications, a welding gun is typically mounted at the free end of the robot. A relatively heavy, mechanical, break-away clutch has proved undesirable, especially with heavier spot welding guns. In these situations, it is desirable to employ a small, relatively light-weight, electronic tactile sensor. The tactile sensor and its associated circuitry must be able to sense an overforce condition such as the robot being stuck to the workpiece or colliding with a fixture.

Sensors for use on robots identify the position and/or orientation of an object; measure the force between the manipulator and an object, or the torque on the manipulator; identify and distinguish one object from several others; determine the position of the robot; and inspect the quality of an object.

Non-contact sensors include visual systems and also include the use of microwaves, liquid jets and photoelectric beams. Contact sensors generally include the use of slip sensors, strain gauges or probes.

Numerous patents are directed to sensing force such as between the robot arm and the object being manipulated or the torque on the manipulator. U.S. Pat. No. 3,904,234 discloses a mechanism for measuring the magnitude of force exerted by a gripper on an object and indicating whether the object is slipping out of the gripper. The force of the grip is measured using proportional sensors or transducers.

Other patents directed to the sensing of force and torque in a robotic environment include U.S. Pat. Nos. 3,952,880; 3,921,445; 4,132,318; and 4,320,392.

Numerous patents show systems which have force-limiting features including circuits for providing alarm and stop signals. For example, U.S. Pat. No. 3,948,093 to Folchi et al discloses a force transducer wherein a moment at a basic module can be measured by the voltage output of a bridge associated with strain gauges.

Another example is shown by U.S. Pat. No. 4,369,663 to Venturello et al. The Venturello et al patent discloses a transducer having detectors which are arranged to measure the capacitance of a number of capacitors and thereafter provide an electrical signal indicative of the forces and moments applied to a movable member.

U.S. Pat. No. 3,919,563 to Lautier et al discloses a safety fastener which automatically releases upon sensing and transducing at least one force which is applied to a fastening element of the fastener. Means are provided for integrating a signal from the sensing and transducer means and comparing the signal with a given least reset value for the integrating means. Means are also provided for comparing the signal integral to a given maximum value. The fastener is unlocked when the integral is above the maximum value.

One problem that should be addressed by any such signal processing circuit is when two forces appear along two different axes of the tactile sensor. The forces should not cancel themselves and, thereby, fail to deliver a stop signal.

DISCLOSURE OF THE INVENTION

An object of the present invention is to provide an electronic circuit which quickly and accurately responds to conditioned force signals from a three-axis load cell mounted on the end of a robot to provide a stop signal for use by the controller of the robot to prevent an overload condition.

Another object of the present invention is to provide an electronic circuit adapted to receive conditioned force signals from a three-axis load cell mounted on the end of the robot to provide a stop signal only upon the occurrence of an overload condition at a time when the robot does not ordinarily experience an overload condition.

In carrying out the above objects and other objects of the present invention, the electronic circuit comprises computing means for computing the absolute value of each of the force signals, adding means for adding the absolute values to obtain a resulting value, comparing means for comparing the resulting value with a threshold value to obtain a trigger signal when the resulting value exceeds the threshold value and means responsive to the trigger signal to provide the stop signal.

Preferably, the circuit responsive to the trigger signal also includes a masking means responsive to the controller for suppressing the trigger signal to prevent the stop signal.

Also, preferably, the circuit further includes a generating circuit coupled to the comparing means for generating a variable threshold signal representing a variable overload condition.

The circuit of the invention is readily adapted for use with a three-axis tactile transducer and associated signal conditioning circuitry to thereby provide the electronic equivalent to a mechanical clutch. The resulting circuitry is superior to such a mechanical clutch for the following reasons: heavier spot welding guns can be utilized at the end of the robot arms; high accuracy of trip point; faster response time and less down time in production.

The objects, features and advantages of the present invention are readily apparent from the following detailed description of the best mode taken in connection with the accompanying drawings.

BEST MODE FOR CARRYING OUT THE INVENTION

Figure 1:
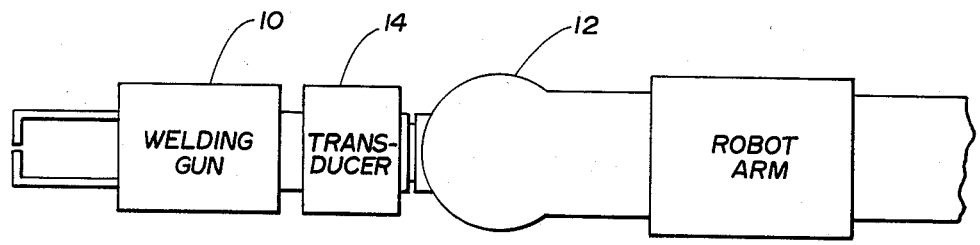
FIG. 1 is an environmental view illustrating the relative position of a welding gun attached at one end of a robot arm and an intermediate transducer.
Figure 2:
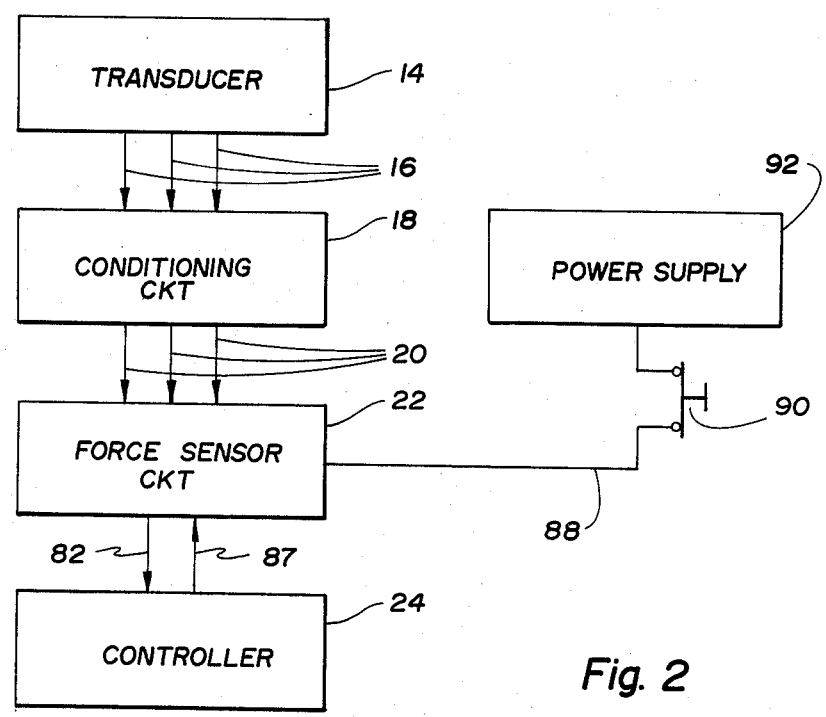
FIG. 2 is a schematic view showing the various interconnections of an electronic circuit of the present invention with the transducer, a robot controller and the manually operated emergency stop button of the robot.

Referring now to FIG. 1 of the drawings, there is illustrated a spot welding gun 10 which is mounted on one end of a robot arm 12. A three-axis tactile transducer 14 is located intermediate the gun 10 and the robot arm 12 to sense the force into the plane of the alpha axis of the robot, $F_x$, the force into the plane of the beta axis of the robot, $F_y$ and the force into the plane of the gamma axis of the robot, $F_z$.

The transducer 14 senses such forces and provides resulting output signals along lines 16 to a conditioning circuit 18 which converts each low level input force signal to a bipolar output signal having a maximum amplitude of 5 volts. The conditioned force signals appear along lines 20 and are processed by a force sensor circuit constructed in accordance with the present invention, generally indicated at 22. Briefly, the force sensor circuit 22 compares the sum of the absolute values of the conditioned force signals with a threshold amount of force. If greater than the threshold amount, the force sense circuit 22 sends a stop signal to a controller 24 of the robot which, in turn, causes the robot to enter an emergency stop condition. As will be described in greater detail hereinbelow, the force sensor circuit 22 includes a masking circuit which prevents the sending of the stop signal to the controller 24 when the robot is being utilized in a situation wherein overload conditions are frequently found. For example, the force sensor circuit 22 will not send out a stop signal when an end effector mounted on the end of the robot arm 12 strikes a parts bin while searching for a part to be installed on a workpiece or when the end effector is being changed.

Figure 3:
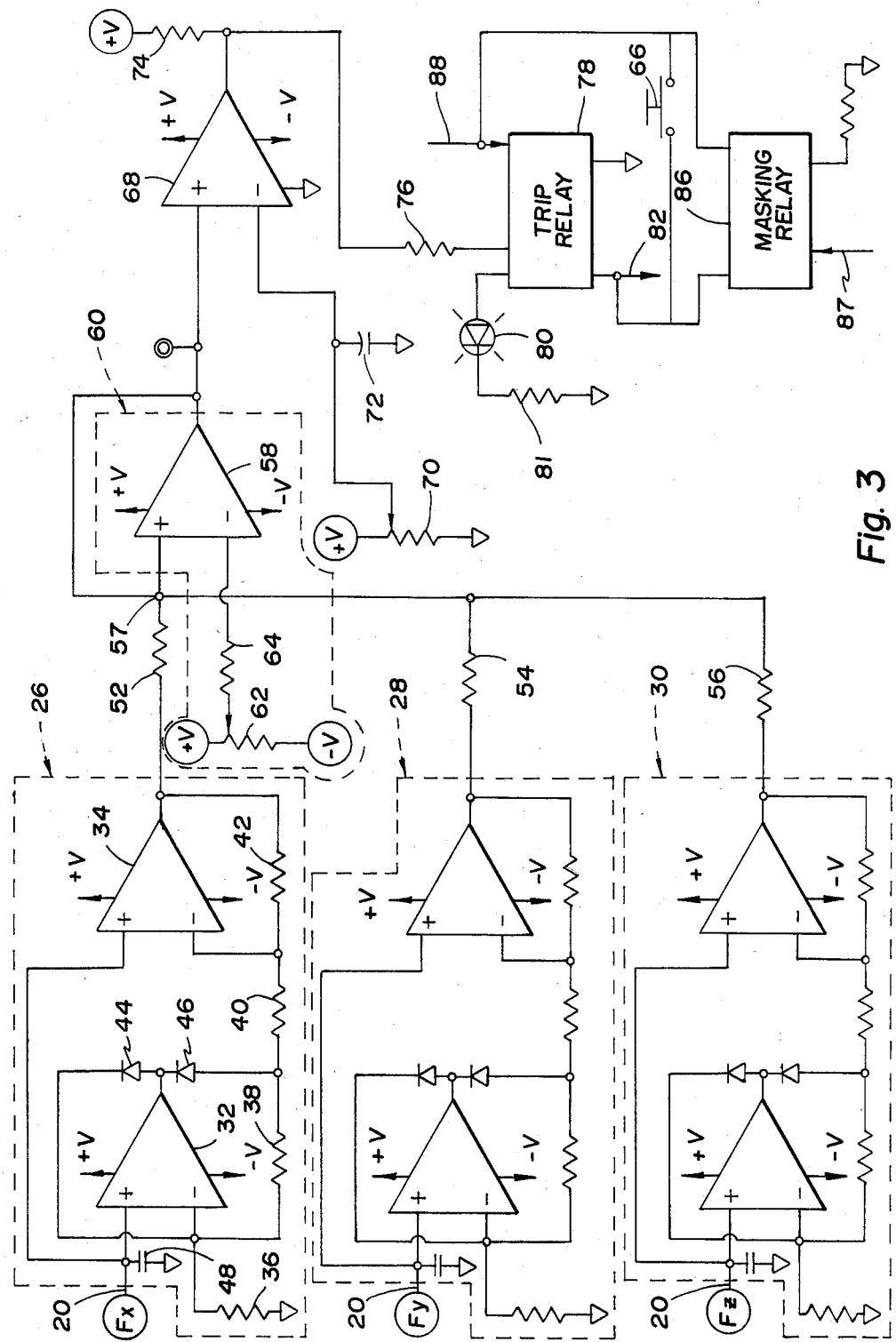
FIG. 3 is a schematic illustration of the electronic circuit of the present invention.

Referring now to FIG. 3, the force sensor circuit 22 includes three conventional absolute value circuits, generally indicated at 26, 28 and 30, connected in parallel for computing the absolute value of $F_x$, $F_y$ and $F_z$ respectively, appearing along lines 20. Since the absolute value circuits 26 through 30 are identical, only the absolute value circuit 26 will be described in detail hereinbelow.

The absolute value circuit 26 includes a pair of intercoupled amplifiers 32 and 34. The positive inputs of the amplifiers 32 and 34 are connected together to the line 20 on which the $F_x$ signal is received. The circuit 26 also includes a grounded capacitor 48 connecting the line 20 to ground to reduce noise appearing on the line 20 and four interconnected gain scaling resistors 36, 38, 40 and 42. The value of the resistors 36 through 40 are substantially the same, whereas the values of the resistor 42 is twice as large. Gain switching between negative and positive input ranges of a voltage occurring on the line 20 is accomplished by the amplifier 32 and diodes 44 and 46 which are coupled to the output of the amplifier 32. In this way only the positive half cycles of the input signal are allowed at the negative input of the amplifier 32. The circuit 26 has a unity gain. Not only is the input of the circuit 26 self-buffered, but the output of the circuit 26 is continuously buffered by the amplifier 34. Consequently, the circuit 26 can be considered a unity-gain, self-buffered, absolute-value circuit.

The force sensor circuit 22 also includes an adding means or summing circuit, including resistors 52, 54 and 56 which are respectively connected in series to their respective absolute value circuits 26 through 30 and to each other at node 57. The resulting signal at node 57 comprises the additive sum of the absolute values of $F_x$, $F_y$ and $F_z$ and is applied to the positive input of an amplifier 58 of a buffer circuit, generally indicated at 60. An offset circuit comprising a biased variable resistor 62 and an interconnected resistor 64 are connected to the negative input of the amplifier 58 to balance-off any offset which normally occurs at the positive input of the amplifier 58 in the absence of any force experienced by the transducer 14.

The output of the buffer circuit 60 is fed into the positive input of a comparing means or comparator 68. The comparator 68 compares the resulting value appearing at its positive input with a variable threshold signal appearing at its negative input. The comparator 68 provides a trigger signal when the resulting value appearing at the positive input exceeds the variable threshold signal appearing at its negative input. The variable threshold signal is generated by a biased variable resistor 70 which is stabilized by a grounded capacitor 72.

The output of the comparator 68 is connected to the node between a pull-up resistor 74 and a current limiting resistor 76. The trigger signal appearing at the output of the comparator 68 is coupled to one input of a solid-state force trip relay 78. One output of the relay 78 is connected to a light-emitting diode 80 to cause the diode 80 to be energized through a resistor 81, thereby indicating an over-force condition when the relay 78 is tripped. A second output of the trip relay 78 appears on a line 82 which is also connected to one output of a solid-state masking relay 86. The masking relay 86 and a manual mask switch 66 are connected in parallel to the trip relay 78. The masking relay 86 is controlled along a line 87 leading from the controller 24 and coupled to one input of the masking relay 86. Second input lines 88 of the trip relay 78, the masking relay 86 and the manual mask switch 66 are also connected to one pole of a normally closed emergency push button 90. The manual mask switch 66 allows the operation to remove the robot from a high force situation.

The push button 90 is manually operated and is typically mounted on the front panel of the robot to interrupt the voltage signal applied by a power supply 92 to the controller 24 to thereby turn off the robot in an emergency situation. In the same fashion, the trip relay 78 is also able to interrupt the voltage signal applied by the power supply 92 during an overload situation as long as the masking relay 86 has not been triggered by the controller 34.

The force sensor circuit 22 operates as follows. Force signals representing the force sensed by the transducer 14 are conditioned by the conditioning circuit 18 and are subsequently fed to the force sensor circuit 22 at its absolute value circuits 26 through 30. Each of the absolute values are computed, added together and coupled to the positive input of a comparator 68 for comparing with a variable threshold signal. If greater than the variable threshold signal, the output of the comparator 68 causes the trip relay 78 to trip. The resulting output signal 82 appearing on line 82 is sent to the controller 24 as long as the masking relay 86 has not been tripped by the controller 24. If the masking relay 86 is also tripped, there is no need to signal an emergency condition to the controller 24 since it is understood that the robot is in a condition in which overload conditions frequently occur as mentioned above. The open circuit caused by the emergency push button 90 being pushed overrides any other condition the relays 78 and 86 may be in to cause an emergency signal to be sent to the controller 24.

While the above invention has been described with reference to a specific hard-wired design, it is to be understood that the invention could also be practiced through the use of a specially programmed microcomputer and associated interface circuits.

While the best mode for carrying out the invention has been described herein in detail, those familiar with the art to which this invention relates will recognize various alternative designs and embodiments for practicing the present invention as defined by the following claims.

What is claimed is:

1. An electronic circuit adapted to receive conditioned input signals from a 3-axis load cell mounted on the arm of a robot, the circuit providing a stop signal for use by a controller of the robot to prevent an overload condition, the circuit comprising:

computing means for computing the absolute value of each of the input signals;

adding means for adding the absolute values to obtain a resulting value;

comparing means for comparing the resulting value with a threshold value to obtain a trigger signal when the resulting value exceeds the threshold value; and means responsive to said trigger signal to provide the stop signal.

2. The circuit as claimed in claim 1 further including generating means coupled to said comparing means for generating a variable threshold signal representing a variable overload condition.

3. The circuit as claimed in claim 1 or claim 2 wherein said means responsive to said trigger signal includes masking means responsive to the controller for suppressing said trigger signal to prevent said stop signal.

4. The circuit as claimed in claim 3 wherein said computing means comprises three absolute value circuits, each of said absolute value circuits producing an output equal to the magnitude of its input.

5. The circuit as claimed in claim 4 wherein said adding means comprises a summing circuit.

6. The circuit as claimed in claim 5 wherein said comparing means includes a comparator.

7. The circuit as claimed in claim 3 wherein said masking means comprises a first device for controlling the issuance of said stop signal.

8. The circuit as claimed in claim 7 including a second device coupled in parallel to said first device and receiving said trigger signal.

* * * * *